(12) United States Patent
Kumakawa (10) Patent No.: US 7,948,556 B2
(45) Date of Patent: May 24, 2011

(54) ELECTRONIC APPARATUS AND DISPLAY CONTROL METHOD

(75) Inventor: Masanobu Kumakawa, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 12/499,675

(22) Filed: Jul. 8, 2009

(65) Prior Publication Data
US 2010/0149413 A1 Jun. 17, 2010

(30) Foreign Application Priority Data

Dec. 15, 2008 (JP) ................................. 2008-318977

(51) Int. Cl.
*H04N 7/01* (2006.01)
*H04N 11/20* (2006.01)
*H04N 11/00* (2006.01)
*H04N 5/00* (2006.01)
*H04N 3/14* (2006.01)
*H03L 7/00* (2006.01)

(52) U.S. Cl. ........ 348/441; 348/443; 348/447; 348/552; 348/607; 348/790; 348/540; 348/542; 348/547

(58) Field of Classification Search .................. 348/443, 348/447, 540, 542, 547, 552, 555, 607, 790, 348/441
See application file for complete search history.

(56) References Cited

U.S. PATENT DOCUMENTS

| | | | | |
|---|---|---|---|---|
| 5,929,924 A | * | 7/1999 | Chen | 348/552 |
| 6,304,297 B1 | * | 10/2001 | Swan | 348/556 |
| RE38,079 E | * | 4/2003 | Washino et al. | 348/722 |
| 7,071,992 B2 | * | 7/2006 | Chen et al. | 348/441 |
| 7,206,025 B2 | * | 4/2007 | Choi | 348/441 |
| 7,359,007 B2 | * | 4/2008 | Wu | 348/581 |
| 7,388,618 B2 | * | 6/2008 | Tardif | 348/515 |
| 7,499,043 B2 | * | 3/2009 | Vasqnez et al. | 345/212 |
| 7,697,064 B2 | * | 4/2010 | Komatsu | 348/453 |
| 2005/0030306 A1 | * | 2/2005 | Lan et al. | 345/211 |
| 2007/0273787 A1 | | 11/2007 | Ogino et al. | |
| 2009/0327777 A1 | * | 12/2009 | Vasquez et al. | 713/320 |

FOREIGN PATENT DOCUMENTS

| | | |
|---|---|---|
| JP | 11-003063 A | 1/1999 |
| JP | 2001-086364 A | 3/2001 |
| JP | 2002-244632 A | 8/2002 |

(Continued)

OTHER PUBLICATIONS

Explanation of Non-English Language Reference(s).
Notice of Reasons for Rejection mailed by Japan Patent Office on Oct. 20, 2009 in the corresponding Japanese patent application No. 2008-318977.

(Continued)

*Primary Examiner* — Brian Yenke
(74) *Attorney, Agent, or Firm* — Knobbe, Martens, Olson & Bear LLP (57) ABSTRACT

According to an aspect of the present invention, there is provided an electronic apparatus including: a detection unit configured to detect a start of a reproducing of a motion picture to be displayed on a display unit; a change unit configured to change a refresh rate of the display unit when the start of the reproducing of the motion picture is detected, the refresh rate being changed not by changing an operating frequency of the display unit, the refresh rate being changed by changing a blanking period, the blanking period being a period during which a drawing operation of a screen on the display unit is not performed; and a control unit configured to control the display unit to display the motion picture based on the changed refresh rate.

6 Claims, 7 Drawing Sheets

FOREIGN PATENT DOCUMENTS

| | | |
|---|---|---|
| JP | 2003-215542 A | 7/2003 |
| JP | 2006-098765 | 4/2006 |
| JP | 2006-098765 A | 4/2006 |
| JP | 2006-287898 | 10/2006 |
| JP | 2006-287898 A | 10/2006 |
| JP | 2007-318193 | 12/2007 |
| JP | 2007-318193 A | 12/2007 |
| JP | 2007-323069 A | 12/2007 |

OTHER PUBLICATIONS

Notice of Reasons for Rejection mailed by Japan Patent Office on Jan. 26, 2010 in the corresponding Japanese patent application No. 2008-318977.

Notice of Reasons for Rejection mailed by Japan Patent Office on May 11, 2010 in the corresponding Japanese patent application No. 2008-318977.

* cited by examiner

HDTV 60Hz

| PARAMETER | VALUE | UNIT |
|---|---|---|
| PIXEL CLOCK | 148.5 | MHz |
| H TOTAL | 2200 | |
| H ACTIVE | 1920 | |
| H BLANK | 280 | |
| H SYNC | 67.5 | kHz |
| V TOTAL | 1125 | |
| V ACTIVE | 1080 | |
| V BLANK | 45 | |
| V SYNC | 60 | Hz |

FIG. 5

HDTV 59.94Hz

| PARAMETER | VALUE | UNIT |
|---|---|---|
| PIXEL CLOCK | 148.5 | MHz |
| H TOTAL | 2200 | |
| H ACTIVE | 1920 | |
| H BLANK | 280 | |
| H SYNC | 67.432 | kHz |
| V TOTAL | 1125 | |
| V ACTIVE | 1080 | |
| V BLANK | 45 | |
| V SYNC | 59.939 | Hz |

FLAT PANEL DISPLAY 60Hz

| PARAMETER | VALUE | UNIT |
|---|---|---|
| PIXEL CLOCK | 135 | MHz |
| H TOTAL | 2000 | |
| H ACTIVE | 1920 | |
| H BLANK | 80 | |
| H SYNC | 67.5 | kHz |
| V TOTAL | 1125 | |
| V ACTIVE | 1080 | |
| V BLANK | 45 | |
| V SYNC | 60 | Hz |

FIG. 9

FLAT PANEL DISPLAY 59.94Hz

| PARAMETER | VALUE | UNIT |
|---|---|---|
| PIXEL CLOCK | 135 | MHz |
| H TOTAL | 2002 | |
| H ACTIVE | 1920 | |
| H BLANK | 82 | |
| H SYNC | 67.433 | kHz |
| V TOTAL | 1125 | |
| V ACTIVE | 1080 | |
| V BLANK | 45 | |
| V SYNC | 59.94 | Hz |

ELECTRONIC APPARATUS AND DISPLAY CONTROL METHOD

CROSS-REFERENCE TO RELATED APPLICATIONS

This application is based upon and claims the benefit of priority from Japanese Patent Application No. 2008-318977, filed on Dec. 15, 2008, the entire contents of which are incorporated herein by reference.

BACKGROUND

1. Field

An aspect of the present invention relates to an electronic apparatus and a display control method for changing a refresh rate.

2. Description of the Related Art

Use of notebook type portable computers (hereinafter referred to notebook PC) has heretofore increased with the advance in computer technology. Such a notebook PC is equipped with a flat panel display which is subjected to display control of screen information.

Nowadays there is a growing tendency toward use of the notebook PC for viewing motion picture contents as the notebook PC becomes widespread. In NTSC-compliant motion pictures, the motion picture contents are 29.97 fps or 59.94 fps. On the other hand, the flat panel display generally has a refresh rate of 60 Hz. When motion picture contents of 59.94 fps are displayed on the flat panel display having a refresh rate of 60 Hz, "tearing" occurs.

Therefore, JP-2006-098765-A proposes a technique of discriminating between a still picture and a motion picture to obtain synchronization with the rate of motion picture contents at the time of motion picture reproducing.

However, in JP-2006-098765-A, there is no description about display timing at which the rate of the motion picture contents is synchronized. Although it is general that pixel clock is changed for synchronizing the rate of the motion picture contents, there is a problem that the screen blinks when such switching is performed.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an electronic apparatus including: a detection unit configured to detect a start of a reproducing of a motion picture to be displayed on a display unit; a change unit configured to change a refresh rate of the display unit when the start of the reproducing of the motion picture is detected, the refresh rate being changed not by changing an operating frequency of the display unit, the refresh rate being changed by changing a blanking period, the blanking period being a period during which a drawing operation of a screen on the display unit is not performed; and a control unit configured to control the display unit to display the motion picture based on the changed refresh rate.

Embodiment of the invention as to an electronic apparatus and a display control method will be described below in detail with reference to accompanying drawings. Although a notebook PC is described as the electronic apparatus according to the embodiment in the following description, the embodiment may be applied to another electronic apparatus.

Figure 1:
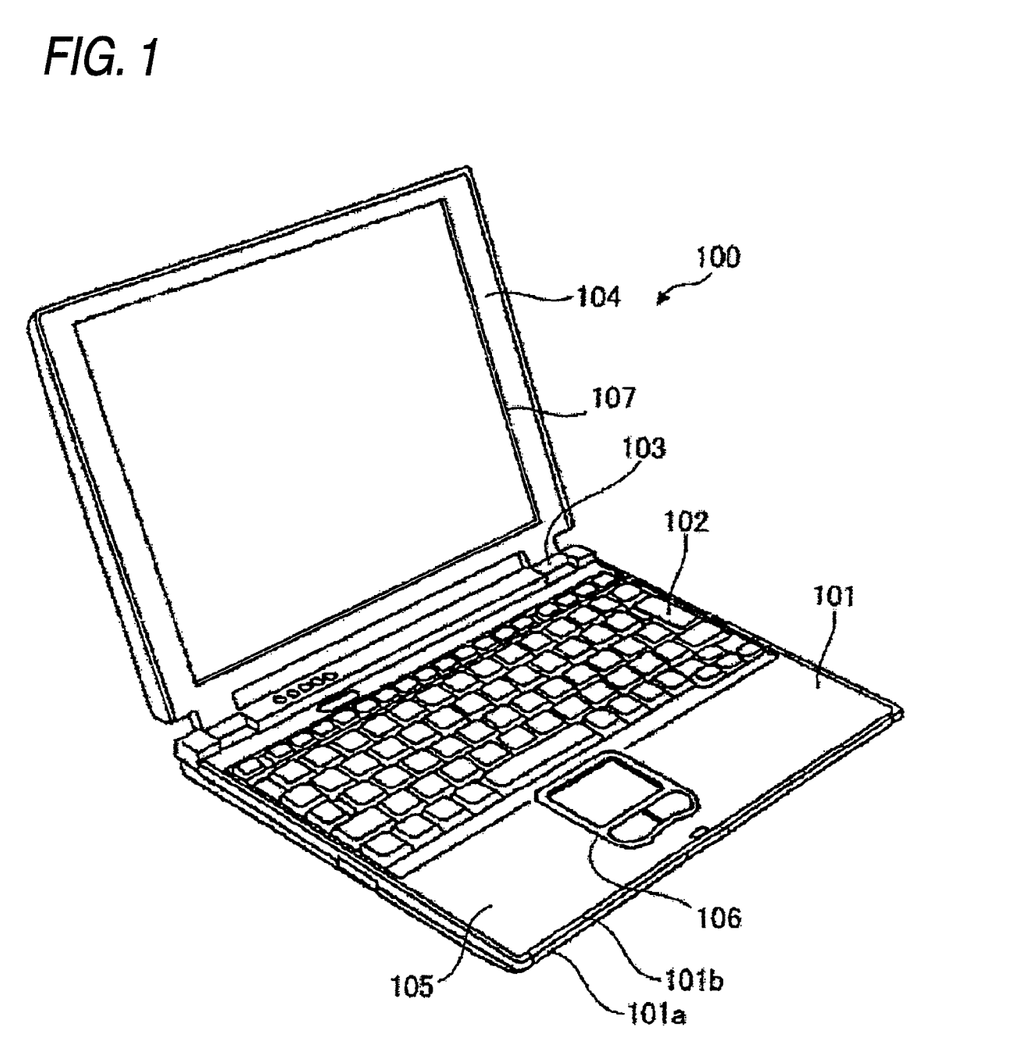
FIG. 1 is an exemplary perspective view showing the external appearance of a notebook PC 100 according to a first embodiment of the invention.

(First Embodiment) FIG. 1 is a perspective view showing the external appearance of a notebook PC 100 according to a first embodiment of the invention. As shown in FIG. 1, the notebook PC 100 has a housing 101, a keyboard 102 provided on the housing 101, and a panel housing 104 rotatably connected to the housing 101 through a hinge portion 103. The housing 101 has a lower casing 101a, and an upper casing 101b. A front end portion of an upper surface of the upper casing 101b forms a palm rest portion 105. A touch pad 106 is provided substantially in the center of the palm rest portion 105. A flat panel display 107 for performing display is provided in a central region of the panel housing 104.

Assume that the refresh rate of the flat panel display 107 built in the notebook PC 100 is 60 Hz which is equal to that of a general notebook PC. When NTSC-compliant motion picture contents of 29.97 fps or 59.94 fps are reproduced, a phenomenon called 'tearing' occurs because it is necessary to display the same picture once per 16-17 seconds in accordance with a difference in the number of frames displayed for a second.

Therefore, in the notebook PC 100 according to this embodiment, the refresh rate is seamlessly changed to 59.94 Hz in order to avoid 'tearing' when motion picture contents of 29.97 fps or 59.94 fps are reproduced on the built-in flat panel display 107 of the notebook PC 100. That is, the refresh rate of 59.94 Hz is set to be the same as the frame rate of the original NTSC signal. That is, 59.94 Hz is the most suitable refresh rate for reproducing NTSC-compliant motion picture contents, so that picture quality can be improved. A configuration and a processing procedure for changing the refresh rate will be described later. In practical operation, the refresh rate may be changed to a value close to 59.94 Hz.

When reproducing of the motion picture contents is completed, the refresh rate is seamlessly returned from 59.94 Hz to 60 Hz. This embodiment will be described on a method of changing the refresh rate seamlessly to display motion picture contents on the flat panel display 107.

A display control unit described in this embodiment is effective for the flat panel display in which the refresh rate change is limited in some degree rather than a CRT in which the refresh rate is easily changed, for example.

Figure 2:
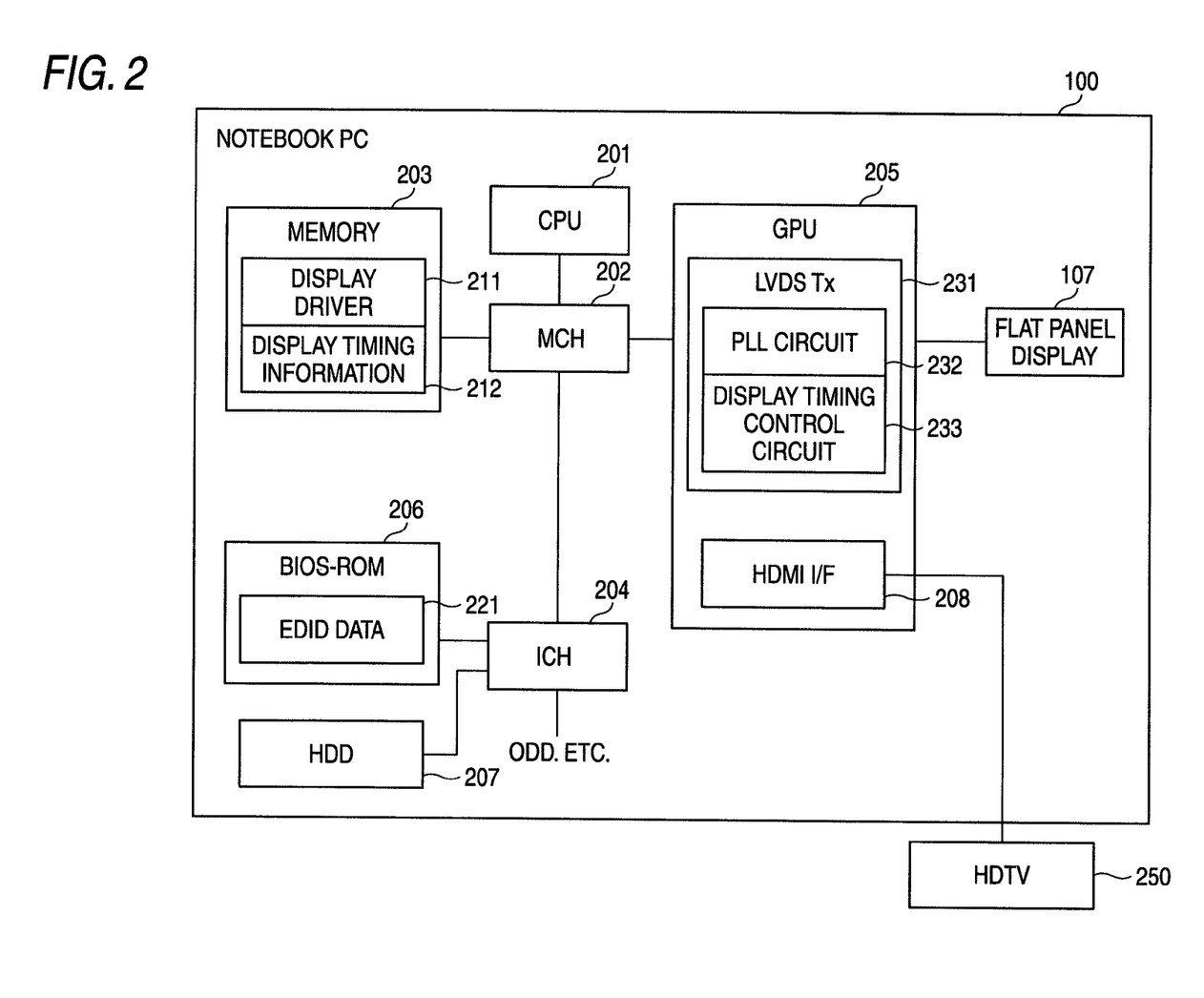
FIG. 2 is an exemplary block diagram showing the hardware configuration of the notebook PC 100 according to the first embodiment.

First, the hardware configuration of the notebook PC 100 according to this embodiment will be described. As shown in FIG. 2, the notebook PC 100 has a CPU 201, a memory controller hub (MCH) 202, a main storage (memory 203), an I/O controller hub (ICH) 204, a graphics controller (GPU) 205, a BIOS-ROM 206, an auxiliary storage (HDD 207), a flat panel display 107, and an HDMI (High-Definition Multimedia Interface)_I/F 208. The ICH 204 is connected to various devices such as ODD, etc. which are not shown in FIG. 2. The auxiliary storage is not limited to the HDD 207 and any other storage device may be used as the auxiliary storage.

The CPU 201 is a processor for controlling the operation of the notebook PC 100. The CPU 201 executes an operating system (OS) loaded from the HDD 207 to the memory 203. The CPU 201 also executes a system BIOS (Basic Input Output System) stored in the BIOS-ROM 206. The system BIOS is a program for hardware control.

The BIOS-ROM 206 stores not only the system BIOS but also a plurality of EDID (Extended Display Identification Data) data 221 for display control of the flat panel display 107. These EDID data 221 are expanded on the memory 203 if necessary. A display mode corresponding to the flat panel display 107 is written in the EDID data 221.

The memory controller hub (MCH) 202 is a bridge device for connecting a local bus of the CPU 201 and the ICH 204 to each other. The MCH 202 has a built-in memory controller for access control of the memory 203. The MCH 202 further has a function of performing communication with the graphics controller 205 through an AGP (Accelerated Graphics Port) bus, a PCI express-based serial bus, etc.

The graphics controller 205 is a display controller for controlling the flat panel display 107. The graphics controller 205 is a display controller for controlling the flat panel display 107 used as a display monitor of the notebook PC 100. The graphics controller 205 generates a display signal in accordance with a request issued from the OS or an application program and transfers the display signal to the flat panel display 107.

The graphics controller 205 may perform display control of an HDTV 205. In this case, the graphics controller 205 generates a display signal in accordance with a request issued from the OS or an application program and transfers the display signal to the HDTV 250 in the same manner as described above.

The graphics controller 205 has a built-in LVDS_TX (Low Voltage Differential Signaling Transmitter) 231. The LVDS_TX 231 has a PLL circuit 232, and a display timing control circuit 233. The LVDS_TX 231 is connected to the flat panel display 107. The LVDS_TX 231 generates a display signal for the flat panel display 107.

The PLL circuit 232 can generate any pixel clock (operating frequency). When, for example, the PLL circuit operates at 68.5 MHz, the LVDS_TX 231 outputs a signal at 68.5 MHz to the HDTV 250 or the flat panel display 107. When a request is given to the PLL circuit 232 to change the operating frequency, the PLL circuit 232 can change the operating frequency of the LVDS_Tx 231.

The display timing control circuit 233 generates a display signal in accordance with display timing information designated by a display driver 303 which will be described later. Incidentally, the display timing information is held as EDID data 221 in the BIOS-ROM 206 in advance.

The graphics controller 205 further has the HDMI_I/F 208. The notebook PC 100 is connected to the HDTV (High Definition Television) 250 through the HDMI_I/F 208. Consequently, the notebook PC 100 can display screen data on the HDTV 250.

The memory 203 holds the display timing information 212 and the display driver 211 based on processing in the system BIOS and the OS after the notebook PC 100 is booted up. The display driver 211 is a program read from the HDD 207 under the control of the OS.

The display timing information 212 is information which is read from the EDID data 221 of the BIOS-ROM 206 and expanded on the memory 203 in order to set the display timing of the flat panel display 107. The display timing information 212 is also information which is read from the HDTV 250 and expanded on the memory 203 in order to perform timing control of the HDTV 250 connected through the HDMI_I/F 208.

The I/O controller hub (ICH) 204 controls respective devices on an LPC (Low Pin Count) bus and respective devices connected to a PCI (Peripheral Component Interconnect) bus. The ICH 204 has a built-in IDE (Integrated Drive Electronics) controller for controlling the HDD 207.

Figure 3:
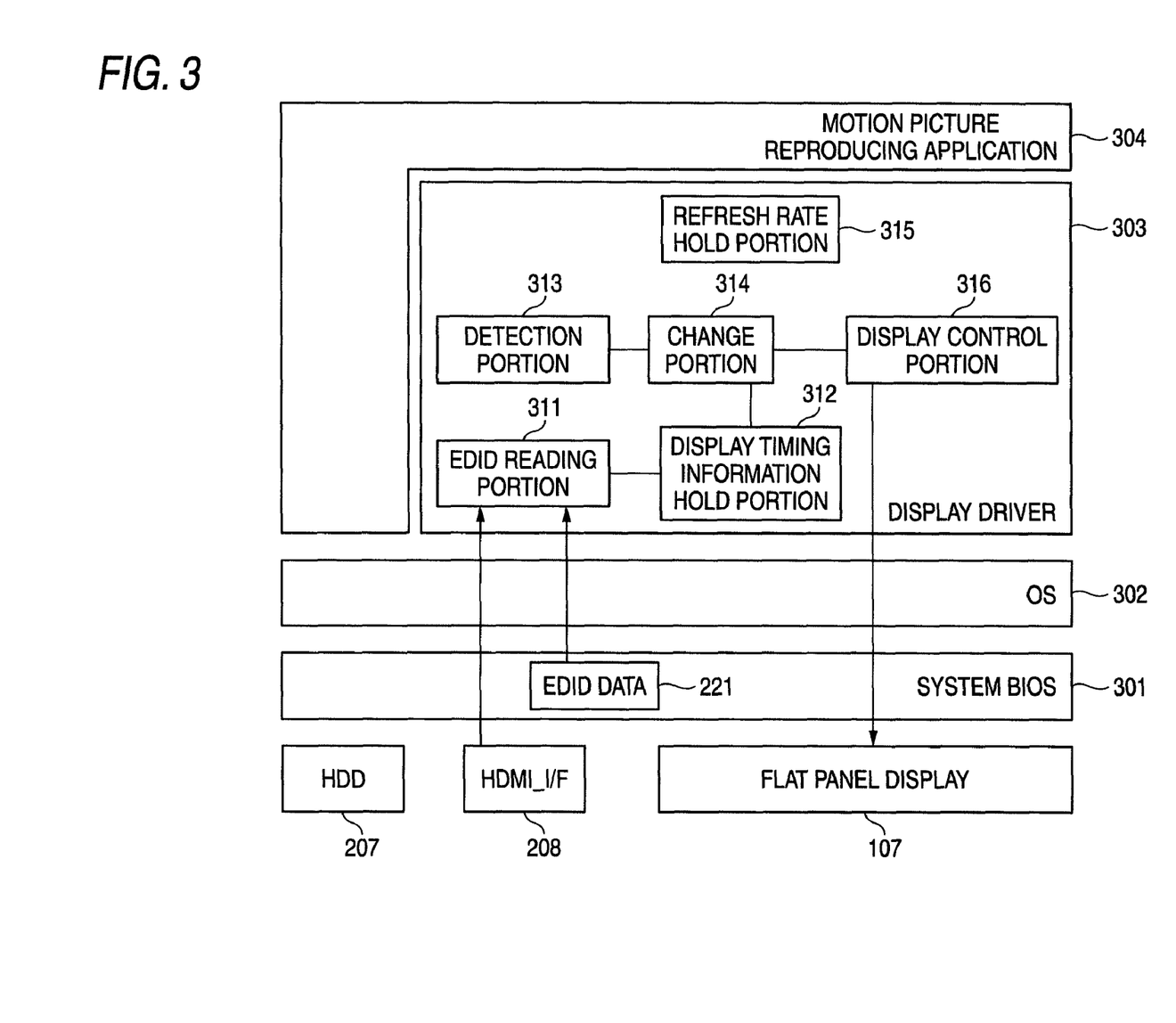
FIG. 3 is an exemplary block diagram showing the software configuration of the notebook PC 100 according to the first embodiment.

FIG. 3 is a block diagram showing the software configuration of the notebook PC 100 according to this embodiment. As shown in FIG. 3, the notebook PC 100 has a system BIOS 301, an OS 302, a display driver 303, and a motion picture reproducing application 304. The system BIOS 301 controls hardware devices such as the HDD 207, the HDMI_I/F 208 and the flat panel display 107.

The system BIOS 301 has EDID data 221 and controls hardware in accordance with an instruction from software such as the OS 302.

The EDID data 221 are EDID data for setting the display timing of the flat panel display 107.

The OS 302 performs execution of software (such as the motion picture reproducing application 304 and the display driver 303) and provision of hardware resources to the executed software.

The motion picture reproducing application 304 performs reproducing of motion picture contents. The motion picture contents may be read into a storage device such as the HDD 207 or into an external device connected through a network. The motion picture reproducing application 304 may be a dedicated application or may be a browser or the like.

The display driver 303 has an EDID reading portion 311, a display timing information hold portion 312, a detection portion 313, a change portion 314, a refresh rate hold portion 315, and a display control portion 316.

The EDID reading portion 311 reads EDID data necessary for display control of the flat panel display 107, from the system BIOS 301. Then, display timing information is created from the read EDID data and expanded on the memory 203.

The EDID reading portion 311 reads EDID data necessary for display control of the HDTV 250, from the HDTV 250. Then, display timing information is created from the read EDID data and expanded on the memory 203.

The display timing information hold portion 312 is present on the memory 203 and holds the display timing information expanded on the memory 203 by the EDID reading portion 311.

Figure 4:
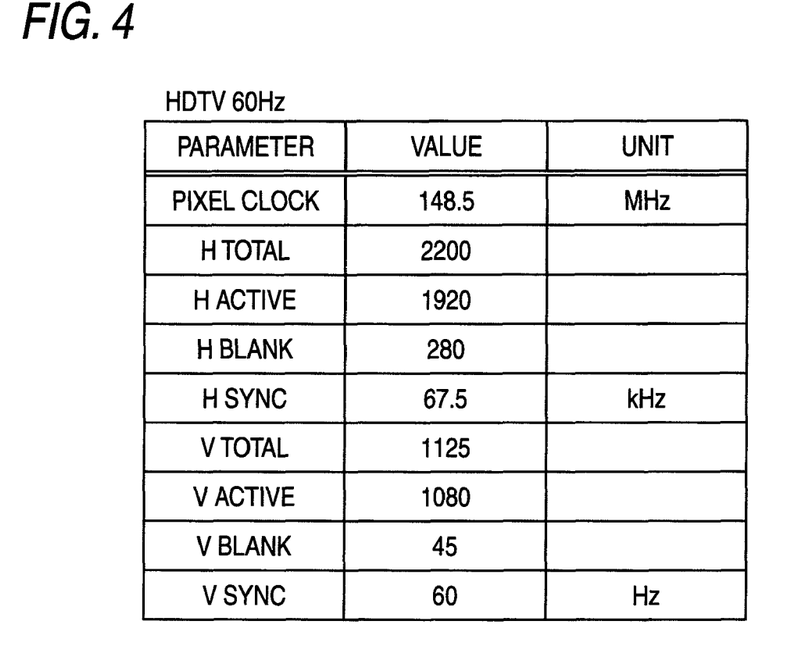
FIG. 4 is an exemplary table showing a first example of display timing for display control of an HDTV.
Figure 5:
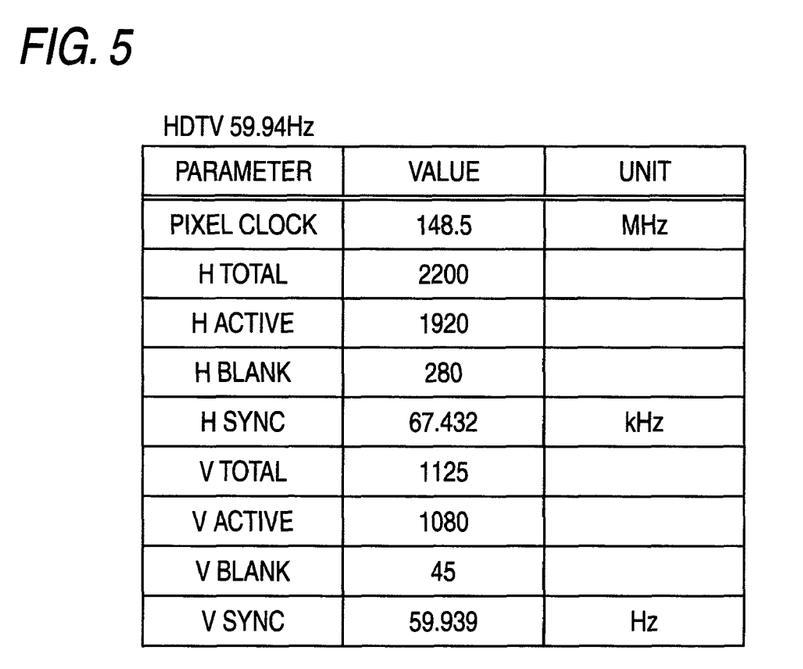
FIG. 5 is an exemplary table showing a second example of display timing for display control of the HDTV.

Although the notebook PC 100 and the HDTV 250 are connected to each other by an HDMI cable, a signal is required to be output at a frequency standardized in order to keep connectivity. For example, display timing for 1920× 1080 called "full HD resolution" is defined as shown in FIGS.

4 and 5. FIG. 4 shows display timing information at the refresh rate of 60 Hz. FIG. 5 shows display timing information at the refresh rate of 59.94 Hz. First, respective parameters used in display timing information for the HDTV 250 will be described.

As shown in FIGS. 4 and 5, "Pixel Clock", "H Total", "H Active", "H Blank", "H sync", "V Total", "V Active", "V Blank" and "V sync" are held in display timing information while related to one another.

"Pixel Clock" indicating an operating frequency is defined as the number of pixels drawn for a second. When, for example, the pixel clock is 68.9 MHz, it is possible to draw 68900000 pixels per second.

"H Total" is a time period necessary for one horizontal line. "H Total" is equal to the sum of "H Active" and "H Blank". "H Active" (horizontal active period) shows a time period (the number of pixels) in which a picture corresponding to one horizontal line is drawn. "H Blank" (horizontal blanking period) shows a time period (the number of pixels) of blanking (non-displaying) in one horizontal line.

"H sync" (horizontal frequency) is defined as the number of (horizontal) lines drawn for a second.

Specifically, the following equation (1) stands up.

$$H\ sync = Pixel\ Clock/(H\ Total) \qquad (1)$$

"V Total" is a time period necessary for drawing one screen. "V Total" is equal to the sum of "V Active" and "V Blank". "V Active" (vertical active period) shows a time period (the number of (horizontal) lines) in which a picture corresponding to one (vertical) screen is drawn. "V Blank" (vertical blanking period) shows a time period (the number of (horizontal) lines) of blanking (non-displaying) in one (vertical) screen.

"V sync" (vertical frequency) shows the number of screens drawn for a second. In other words, "V sync" (vertical frequency) means a refresh rate.

Specifically, the following equation (2) stands up.

$$V\ sync = H\ sync/(V\ Total) \qquad (2)$$

Figure 6:
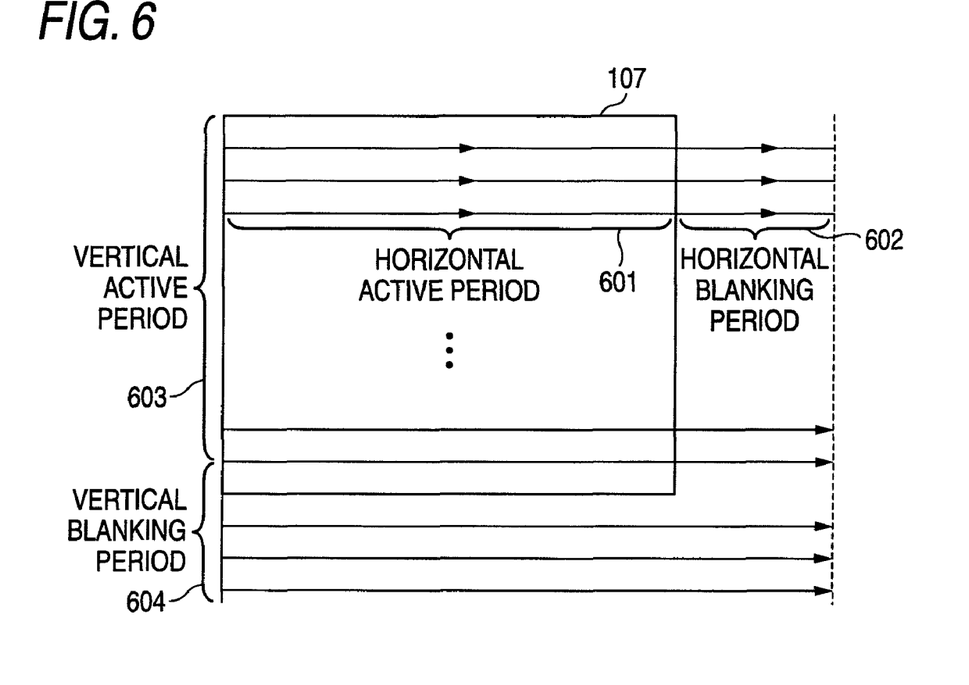
FIG. 6 is an exemplary conceptual view showing respective parameters forming display timing for displaying a screen.

The relationship between these parameters "H Active" (horizontal active period), "H Blank" (horizontal blanking period), "V Active" (vertical active period) and "V Blank" (vertical blanking period) will be described. FIG. 6 is a conceptual view showing these parameters. As shown in FIG. 6, the horizontal active period 601 is a time period (the number of pixels) for drawing one horizontal line on the flat panel display 107. When, for example, the resolution is 1920×1080, the horizontal active period 601 is fixed to 1920 pixels. On the other hand, the horizontal blanking period 602 is a time period for making preparations for drawing the next horizontal line. The horizontal blanking period 602 can be changed in some degree if necessary.

The vertical active period 603 is a time period (the number of lines) for drawing one screen on the flat panel display 107. When, for example, the resolution is 1920×1080, the vertical active period 603 is fixed to 1080 lines. On the other hand, the vertical blanking period 604 is a time period for making preparations for drawing the next screen. The vertical blanking period 604 can be changed in some degree if necessary.

Both display timings shown in FIGS. 4 and 5 are display timing information for a resolution of 1920×1080 but different in parameters such as pixel clock, refresh rate, etc. Specifically, different parameters are "Pixel Clock", "H sync" and "V sync".

Strictly speaking, "V sync" in FIG. 5 is not equal to 59.94 Hz. This means that the reproducing timing of NTSC motion picture contents is not exactly equal to the timing of the refresh rate when the NTSC motion picture contents are reproduced at 29.970029 . . . (59.9400599400 . . . /2) fps.

Incidentally, the difference between the two refresh rates 59.94 Hz and 60 Hz in the HDTV 250 is caused by the operating frequency "Pixel Clock". When the refresh rate is 60 Hz, the pixel clock is set at 148.50 MHz. When the refresh rate is 59.94 Hz, the pixel clock is set at 148.35 MHz. These values cannot be changed because these values are standardized.

If the operating frequency "Pixel Clock" is changed, the screen appears blinking because the display output signal must be stopped. Consequently, there arises a problem that the user becomes aware of change of the refresh rate. If the refresh rate is changed without changing "Pixel Clock", display control can be performed without user's awareness of change of the refresh rate.

In the embodiment, the flat panel display 107 need not conform to the aforementioned definition because the flat panel display 107 is not connected by the HDMI cable but built in the notebook PC 100. That is, display timing can be set freely within the specification of the flat panel display 107 because the connection between the graphics controller 205 and the built-in flat panel display 107 is closed inside the notebook PC 100. Therefore, in the notebook PC 100 according to this embodiment, display timing is determined at the time of design and development so that the graphics controller 205 can perform display control of the flat panel display 107 at the display timing.

Therefore, in this embodiment, the refresh rate is changed by changing the blanking period without changing "Pixel Clock". Referring back to FIG. 3, respective configurations of the notebook PC 100 will be described specifically as follows.

The detection portion 313 detects start of reproducing of motion picture contents displayed on the flat panel display 107. The detection portion 313 further detects suspension of reproducing of the motion picture contents displayed on the flat panel display 107. The refresh rate is changed in accordance with a result of the detection. For example, the detection portion 313 may detect notice of start of reproducing of motion picture contents from the motion picture reproducing application 304 to thereby detect start of reproducing of the motion picture contents.

With respect to the motion picture contents start of reproducing of which is detected by the detection portion 313 according to this embodiment, either 29.97 fps or 59.94 fps can be detected. When the motion picture contents are detected, the change portion 314 changes the refresh rate to 59.94 Hz.

When the detection portion 313 detects start of reproducing of motion picture contents, the change portion 314 changes only the blanking period (horizontal blanking period or vertical blanking period) to a given value (59.94 Hz in this embodiment) determined for reproducing of motion picture contents in advance without changing the operating frequency. The change portion 314 changes the refresh rate by changing only the blanking period. On this occasion, the change portion 314 registers the previous set value (before change) in the refresh rate hold portion 315.

That is, in the notebook PC 100 according to this embodiment, the vertical active period and the horizontal active period are not changed because the resolution is not changed when the refresh rate is changed from 60 Hz to 59.94 Hz without changing the operating frequency "Pixel Clock". The refresh rate is changed while the aforementioned equations (1) and (2) are satisfied in consideration of this situation.

Therefore, in the notebook PC 100 according to this embodiment, only the blanking period (the horizontal blanking period and the vertical blanking period) is changed to thereby change the refresh rate.

When the detection portion 313 detects suspension of reproducing of the motion picture contents, the change portion 314 changes the blanking period to the previous blanking period (before the motion picture reproducing) held in the refresh rate hold portion 315. In this embodiment, the change portion 314 changes the horizontal blanking period to thereby change the refresh rate.

Figure 7A:
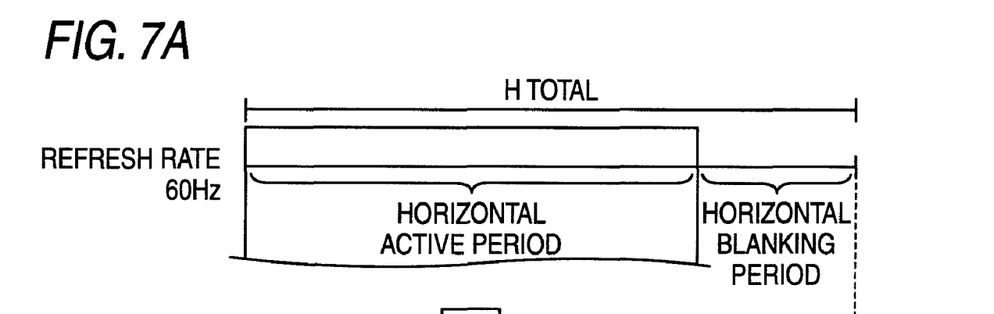
FIGS. 7A and 7B are exemplary views showing the concept of changing a horizontal blanking period.
Figure 7B:
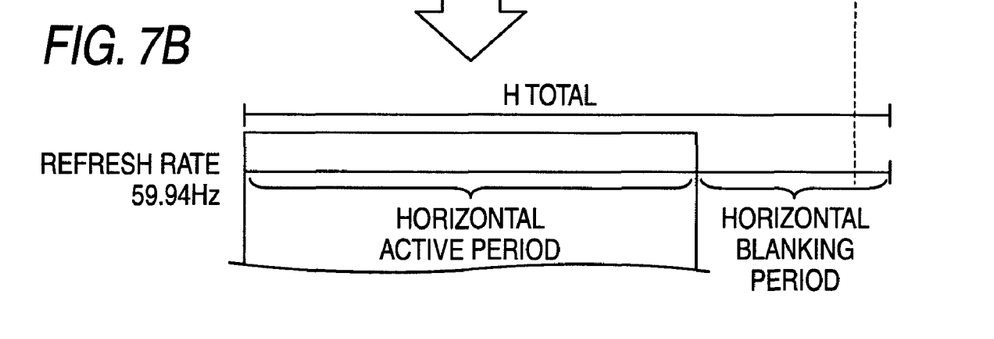

FIGS. 7A and 7B are explanatory views showing the concept of changing the horizontal blanking period. As shown in FIGS. 7A and 7B, in this embodiment, the change portion 314 changes the horizontal blanking period so that the refresh rate can be seamlessly changed between 59.94 Hz and 60 Hz.

As shown in FIGS. 7A and 7B, in this embodiment, the horizontal blanking period is elongated to change the refresh rate from 60 Hz to 59.94 Hz. Consequently, "H Total" becomes long, so that the refresh rate can be shortened based on the equations (1) and (2).

Figure 8:
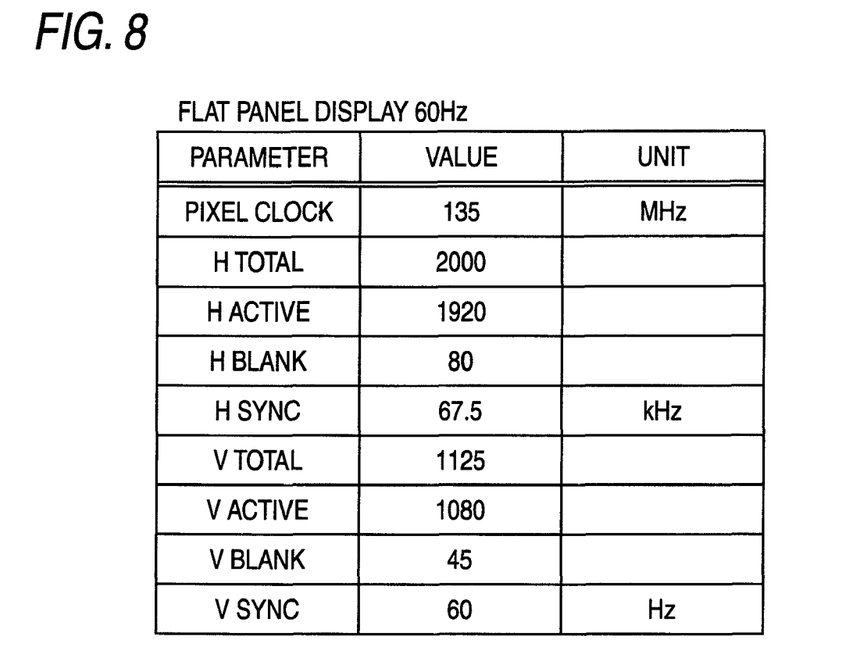
FIG. 8 is an exemplary table showing a first example of display timing for display control of a flat panel display.
Figure 9:
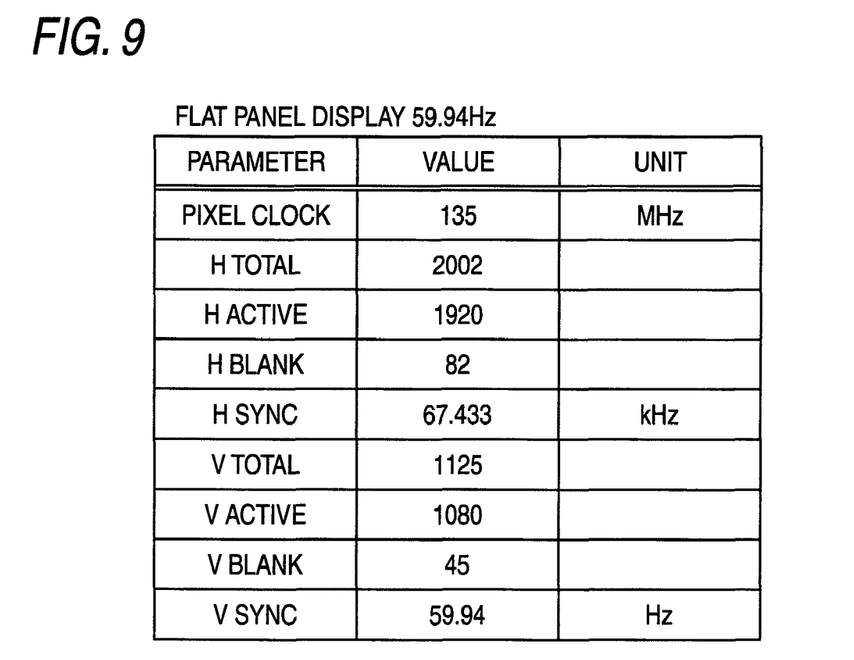
FIG. 9 is an exemplary table showing a second example of display timing for display control of the flat panel display.

FIGS. 8 and 9 are tables showing examples of display timing information for display control of the flat panel display 107. Respective parameter names are the same as in FIGS. 4 and 5 and description thereof will be omitted.

In both FIGS. 8 and 9, "Pixel Clock" is set at 135 MHz. At 60 Hz shown in FIG. 8, the horizontal blanking period "H Blank" is set at 80. At 59.94 Hz shown in FIG. 9, the horizontal blanking period "H Blank" is set at 82.

Consequently, "H Total" is 2000 at 60 Hz and 2002 at 59.94 Hz. That is, the ratio of "H Total" at 60 Hz to "H Total" at 59.94 Hz is 1000:1001. From the viewpoint of these parameters and "Pixel Clock" of 135 MHz, the refresh rate can be changed between 60 Hz and 59.94 Hz without changing "Pixel Clock".

In this manner, in this embodiment, values of respective parameters of display timing information are set so that values of "H Total" at display timings 60 Hz and 59.94 Hz satisfy the aforementioned values (ratio). Although the case where the resolution is 1920×1080 has been described, the embodiment can be applied to another resolution so that the blanking period can be likewise adjusted to change the refresh rate without changing "Pixel Clock".

Because only the blanking period is changed in this manner, it is possible to change the refresh rate without user's awareness.

In this embodiment, after the value of the horizontal blanking period is set so that "H Total" becomes an integral multiple of 1000, other display timing parameters (such as "Pixel Clock") are adjusted to set the refresh rate at 60 Hz. EDID data 221 for creating such display timing information are stored in the BIOS-ROM in advance. The EDID reading portion 311 reads these EDID data 221 as necessary.

Change of display timing including the refresh rate by the change portion 314 is performed within the horizontal or vertical blanking period.

When the detection portion 313 detects motion picture reproducing, the change portion 314 increases only the value of the horizontal blanking period to an integral multiple of "H Total" so that the refresh rate can be set at 59.94 Hz.

The refresh rate hold portion 315 saves the previous display timing information including the blanking period before the display timing information is changed by the change portion 314. When the detection portion 313 detects suspension of reproducing of the motion picture contents, the change portion 314 reads the saved display timing information and changes the display timing information to the original display timing information.

The display control portion 316 performs display control of the flat panel display 107. In this embodiment, the display control portion 316 controls the flat panel display 107 based on the set display timing information.

When the detection portion 313 detects reproducing of motion picture contents and the change portion 314 changes the refresh rate, the display control portion 316 performs display control of the flat panel display 107 at the changed refresh rate. In this manner, the refresh rate can be changed from 60 Hz to 59.94 Hz without user's awareness.

Although the notebook PC 100 according to this embodiment has been described on the case where NTSC motion picture contents are used at 29.97 fps or 59.94 fps, the motion picture data is not limited thereto and the refresh rate can be changed by changing the blanking period in accordance with the number of frames displayed for a second in the motion picture data. Because the refresh rate can be changed by changing the blacking period in this manner, display timing can be changed seamlessly.

The refresh rate of the HDTV 250 cannot be made coincident with the number of frames displayed for a second in the motion picture contents because the refresh rate of the HDTV 250 is standardized. On the contrary, the flat panel display 107 of the notebook PC 100 according to this embodiment can be controlled to be displayed at a refresh rate of 59.94 Hz perfectly coincident with 59.94 fps or twice as much as 29.97 fps of NTSC-compliant motion picture contents, so that 'tearing' can be suppressed.

Figure 10:
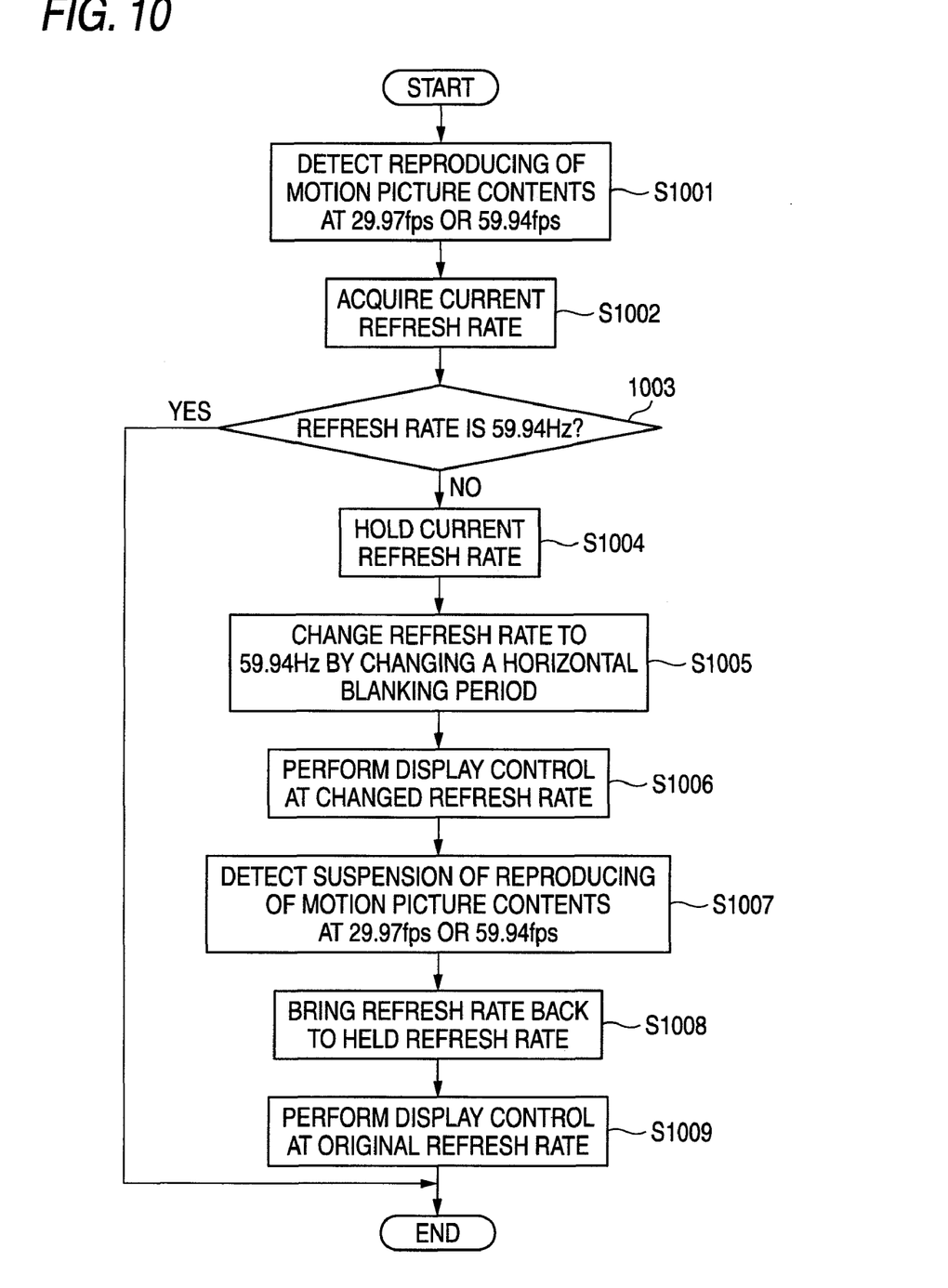
FIG. 10 is an exemplary flow chart showing a procedure of changing a refresh rate for reproducing of motion picture contents in the notebook PC 100.

A procedure of changing the refresh rate for reproducing of motion picture contents in the notebook PC 100 will be described next. FIG. 10 is a flow chart showing the processing procedure in the notebook PC 100.

First, the detection portion 313 detects start of reproducing of motion picture contents by the motion picture reproducing application 304 (step S1001).

Then, the change portion 314 acquires display timing information including the refresh rate currently used for display control (step S1002). Incidentally, the refresh rate is generally set at 60 Hz before the start of reproducing of the motion picture contents.

Then, the change portion 314 determines whether the acquired refresh rate is 59.94 Hz or not (step S1003). When the refresh rate is 59.94 Hz (Yes in the step S1003), this routine is terminated without any processing.

On the other hand, when the refresh rate is determined to be not 59.94 Hz (No in the step S1003), the change portion 314 saves display timing information including the current refresh rate in the refresh rate hold portion 315 (step S1004).

Then, the change portion 314 changes the horizontal blanking period to thereby change the refresh rate to 59.94 Hz (step S1005).

Then, the display control portion 316 performs display control of the flat panel display 107 at the refresh rate changed (based on the horizontal blanking period) (step S1006).

Then, the detection portion 313 detects suspension of reproducing of the motion picture contents (step S1007). Then, the change portion 314 reads the display timing information including the refresh rate held in the refresh rate hold portion 315 and brings the display timing information back to the original display timing information (step S1008). The change of the refresh rate is performed by changing the blanking period.

Then, the display control portion 316 performs display control at the brought-back display timing including the refresh rate (step S1009).

Although this embodiment has been described on the case where the display control is performed by the display driver 303, any program may be used if the program can perform display control.

Although the notebook PC 100 according to this embodiment has been described on the case where the horizontal blanking period is changed, the vertical blanking period may be changed. Although this embodiment has been described on the case where the refresh rate is changed from 60 Hz to 59.94 Hz, the embodiment is not limited thereto but may be applied to any case if the refresh rate can be changed in accordance with the number of frames per second of motion picture data.

Although this embodiment has been described on display timing at a resolution of 1920×1080, the resolution is not limited if the refresh rate can be changed by changing the blanking period without changing the operating frequency "Pixel Clock" as described above.

In the notebook PC 100 according to this embodiment, the refresh rate generally set at 60 Hz is changed to 59.94 Hz only when NTSC-compliant motion picture contents are reproduced. Consequently, 'tearing' can be suppressed.

The horizontal blanking period is changed so that the refresh rate can be seamlessly changed between 59.94 Hz and 60 Hz when the reproducing of motion pictures is started or suspended without user's awareness.

In the notebook PC 100 according to this embodiment, 'tearing' can be suppressed because the refresh rate after changing the horizontal blanking period by the change portion 314 is 59.94 Hz which is coincident with 59.94 fps or twice as much as 29.97 fps of NTSC-compliant motion picture contents. In this embodiment, picture quality is improved more greatly compared with the case where 'tearing' cannot be suppressed completely because, for example, the refresh rate for a resolution of 1920×1080 according to the industry standard is near to 59.94 Hz but strictly not equal to 59.94 Hz as described above.

The invention is not limited to the embodiment and may be modified variously as follows by way of example.

(Modification 1) The first embodiment has been described on the case where the refresh rate of the built-in flat panel display 107 of the notebook PC 100 is changed. However, the invention is not limited to the built-in flat panel display 107 of the notebook PC 100 but can be applied to an external monitor.

As an example for applying the invention to such an external monitor, it may be conceived that a vendor who produces the external monitor provides the external monitor supporting the aforementioned display timing.

That is, any external monitor having a function of changing the refresh rate by changing the aforementioned blanking period can be used. For example, the external monitor may be a CRT. Any connection method such as DVI, DisplayPort, or HDMI is conceivable as the connection method.

The display driver 303 executed in the notebook PC 100 according to this embodiment is provided in the form of an installable or executable file recorded on a computer-readable recording medium such as a CD-ROM, a flexible disk (FD), a CD-R or a DVD (Digital Versatile Disk).

Alternatively, the display driver 303 executed in the notebook PC 100 according to this embodiment may be provided in such a manner that the display driver 303 is stored on a computer connected to a network such as the Internet and downloaded from the computer via the network. In addition, the display driver 303 executed in the notebook PC 100 according to this embodiment may be provided or distributed via a network such as the Internet.

Alternatively, the display driver 303 may be provided from an ROM or the like in which the display driver 303 is incorporated in advance.

The display driver 303 is formed as a module including the respective portions (the EDID reading portion, the detection portion, the change portion and the display control portion). With respect to actual hardware, the CPU 201 reads the display driver 303 from the aforementioned recording medium and executes the display driver 303 to thereby load the respective portions on the memory 203 so that the EDID reading portion, the detection portion, the change portion and the display control portion are created on the memory 203.

According to an aspect of the invention, the refresh rate can be changed without user's awareness.

What is claimed is:

1. An electronic apparatus comprising:
    a detection module configured to detect a reproduction start of movie data of 29.97 fps or 59.94 fps to be displayed on a display module;
    a change module configured to perform a change in a refresh rate of the display module from 60 Hz to 59.94 Hz when the reproduction start of the movie data is detected,
        not by changing an operating frequency for a display control of the display module,
        but by changing a horizontal blanking period so that a sum of the horizontal blanking period and a horizontal active period is changed to satisfy 1000:1001 in a ratio of before and after the change,
        the horizontal blanking period being a period from a finish of a drawing operation of a horizontal line on the display module until a start of the drawing operation of the next horizontal line,
        the horizontal active period being a period during which the drawing operation of the horizontal line is performed; and
    a control module configured to perform the display control of the display module based on the refresh rate changed by the change module.

2. The electronic apparatus of claim 1, further comprising:
    a storage module configured to store the horizontal blanking period and the horizontal active period for realizing the ratio,
    wherein the change module is configured to perform the change based on the stored horizontal blanking period and the stored horizontal active period.

3. The electronic apparatus of claim 1, further comprising:
    a hold module configured to hold the horizontal blanking period before changed by the change module,
    wherein the detection module is further configured to detect a reproduction suspension of the movie data, and
    wherein the change module is further configured to change the horizontal blanking period before the change held by the hold module when the detection module detects the reproduction suspension of the movie data.

4. The electronic apparatus of claim 1, further comprising:
    a flat panel display as the display module,
    wherein the detection module is configured to detect the reproduction start of the movie data displayed on the flat panel display.

5. The electronic apparatus of claim 4,
    wherein the refresh rate of the display module before changed by the change module is 60 Hz.

6. A display control method to be executed by an electronic apparatus, the method comprising:
    detecting a reproduction start of a movie data of 29.97 fps or 59.94 fps to be displayed on a display module;

performing a change in a refresh rate of the display module from 60 Hz to 59.94 Hz when the reproduction start of the movie data is detected,
    not by changing an operating frequency for a display control of the display module,
    but by changing a horizontal blanking period so that a sum of the horizontal blanking period and a horizontal active period is changed to satisfy 1000:1001 in a ratio of before and after the change,
    the horizontal blanking period being a period from a finish of a drawing operation of a horizontal line on the display module until a start of the drawing operation of the next horizontal line,
    the horizontal active period being a period during which the drawing operation of the horizontal line is performed; and
performing the display control of the display module based on the refresh rate changed by performing the change.

* * * * *